(12) United States Patent
Zhang et al.

(10) Patent No.: US 8,891,436 B2
(45) Date of Patent: Nov. 18, 2014

(54) METHOD AND APPARATUS FOR FACILITATING EFFECTIVE SCHEDULING GRANTS

(75) Inventors: Jianqiang Zhang, Beijing (CN); Mingxi Fan, San Diego, CA (US); Jiming Guo, Beijing (CN); Bo Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/641,045

(22) PCT Filed: Oct. 12, 2010

(86) PCT No.: PCT/CN2010/077661
§ 371 (c)(1),
(2), (4) Date: May 16, 2013

(87) PCT Pub. No.: WO2011/143890
PCT Pub. Date: Nov. 24, 2011

(65) Prior Publication Data
US 2013/0223411 A1 Aug. 29, 2013

(51) Int. Cl.
*H04B 7/216* (2006.01)
*H04W 80/04* (2009.01)
*H04B 7/26* (2006.01)

(52) U.S. Cl.
CPC .............. *H04B 7/216* (2013.01); *H04W 80/04* (2013.01); *H04B 7/2628* (2013.01)
USPC ............................. 370/320; 370/328; 370/349

(58) Field of Classification Search
CPC ...... H04B 7/216; H04B 7/2628; H04W 80/04
USPC .............. 370/310.2, 320, 321, 235, 231, 232, 370/328, 329, 335, 337, 342, 341, 347, 349
See application file for complete search history.

(56) References Cited

U.S. PATENT DOCUMENTS

| | | |
|---|---|---|
| 8,305,982 B2 * | 11/2012 | Zhang et al. ................. 370/329 |
| 2007/0025300 A1 | 2/2007 | Terry et al. |
| 2009/0175187 A1 | 7/2009 | Jersenius et al. |
| 2009/0238136 A1 * | 9/2009 | Sambhwani et al. ......... 370/329 |
| 2010/0093386 A1 | 4/2010 | Damnjanovic et al. |

FOREIGN PATENT DOCUMENTS

| | | |
|---|---|---|
| CN | 1719935 A | 1/2006 |
| CN | 101132599 A | 2/2008 |
| CN | 101340622 A | 1/2009 |
| CN | 101605396 A | 12/2009 |
| WO | WO2009022812 | * 2/2009 |

OTHER PUBLICATIONS

International Search Report and Written Opinion—PCT/CN2010/073047, International Search Authority—European Patent Office—Mar. 3, 2011.
International Search Report and Written Opinion—PCT/CN2010/077661—ISA/EPO—Mar. 3, 2011.

* cited by examiner

*Primary Examiner* — Brenda H Pham
(74) *Attorney, Agent, or Firm* — Kristine U. Ekwueme (57) ABSTRACT

A method and apparatus for effectively facilitating grant scheduling is provided. The method may comprise transmitting, by a user equipment (UE), a grant request, wherein the grant request includes a UE power headroom (UPH) value, and receiving, from a Node B, a scheduling grant, wherein the scheduling grant is derived from the transmitted UPH.

32 Claims, 7 Drawing Sheets

METHOD AND APPARATUS FOR FACILITATING EFFECTIVE SCHEDULING GRANTS

CROSS-REFERENCE TO RELATED APPLICATION(S)

This application claims the benefit of International Patent Application No. PCT/CN2010/077661, entitled "Method and Apparatus for Facilitating Effective Scheduling Grants," filed on Oct. 12, 2010 which claims priority to International Patent Application No. PCT/CN2010/073047, entitled "METHOD AND APPARATUS FOR FACILITATING EFFECTIVE SCHEDULING GRANTS," filed on May 21, 2010, which is expressly incorporated by reference herein in its entirety.

BACKGROUND

1. Field

Aspects of the present disclosure relate generally to wireless communication systems, and more particularly, for efficiently scheduling grants in a Time Division-Synchronous Code Division Multiple Access (TD-SCDMA) high speed uplink packet data access (HSUPA) system.

2. Background

Wireless communication networks are widely deployed to provide various communication services such as telephony, video, data, messaging, broadcasts, and so on. Such networks, which are usually multiple access networks, support communications for multiple users by sharing available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and TD-SCDMA. For example, China is pursuing TD-SCDMA as the underlying air interface in the UTRAN architecture with its existing GSM infrastructure as the core network. The UMTS also supports enhanced 3G data communications protocols, such as High Speed Downlink Packet Access (HSDPA), and HSUPA which provide higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with efficiently scheduling grants in a TD-SCDMA HSUPA system. The method can comprise transmitting, by a user equipment (UE), a grant request, wherein the grant request includes a UE power headroom (UPH) value, and receiving, from a Node B, a scheduling grant, wherein the scheduling grant is derived from the transmitted UPH.

Yet another aspect relates to an apparatus. The apparatus can include means for transmitting, by a UE, a grant request, wherein the grant request includes a UPH value, and means for receiving, from a Node B, a scheduling grant, wherein the scheduling grant is derived from the transmitted UPH.

Still another aspect relates to a computer program product comprising a computer-readable medium. The computer-readable medium can include code for transmitting, by a UE, a grant request, wherein the grant request includes a UPH value, and receiving, from a Node B, a scheduling grant, wherein the scheduling grant is derived from the transmitted UPH.

Another aspect relates to an apparatus for wireless communications. The apparatus may further include a transmitter configured to transmit a grant request, wherein the grant request includes a UE power headroom UPH value. The apparatus can include a receiver configured to receive, from a Node B, a scheduling grant, wherein the scheduling grant is derived from the transmitted UPH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
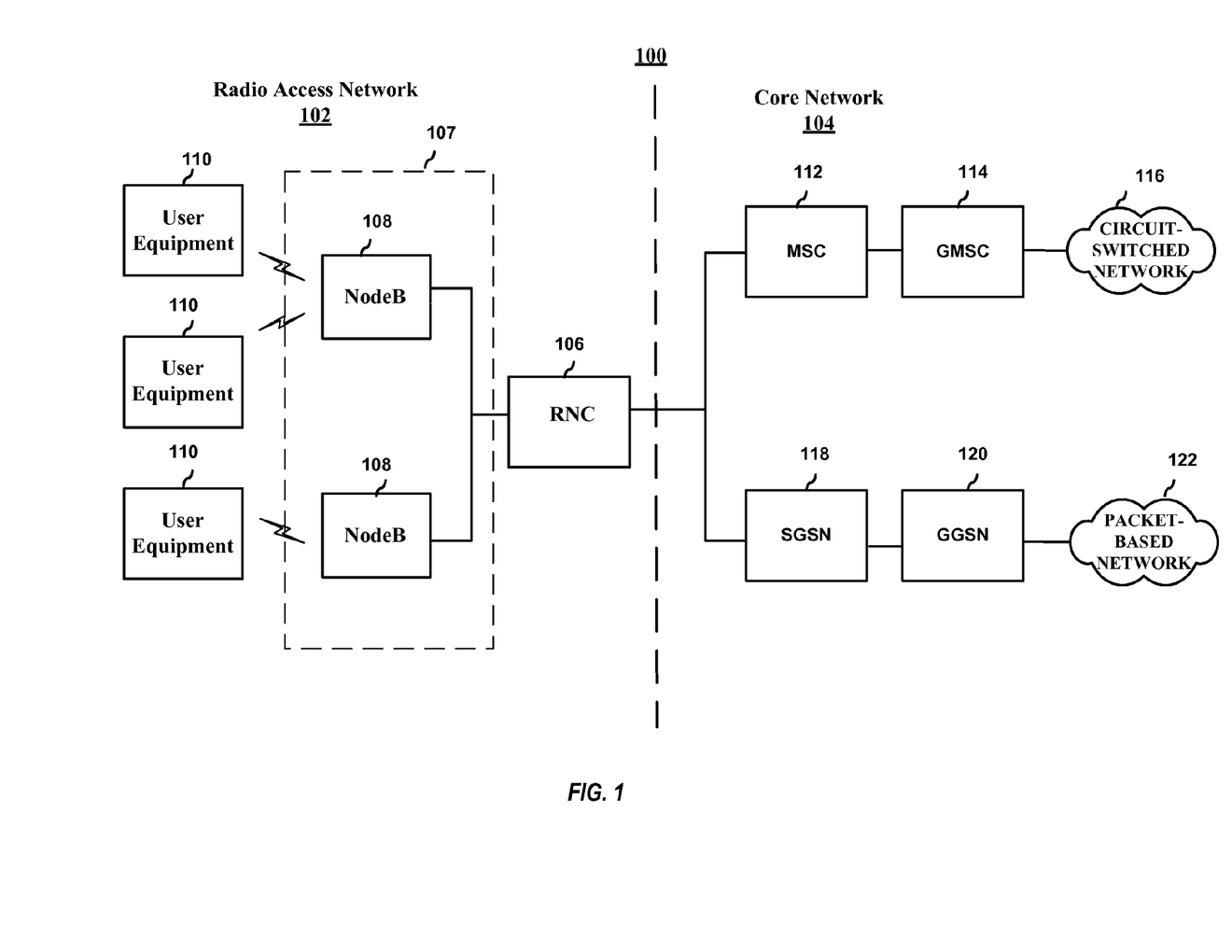
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the UL and DL between a Node B 108 and a UE 110, but divides uplink and downlink transmissions into different time slots in the carrier.

In one aspect, telecommunications system 100 may be operable to use time division HSUPA (TD-HSUPA). In TD-HSUPA specification in 3GPP Rel. 7, and correspondingly in the China Communications Standards Association (CCSA) ver. 3.0, $P_{e\text{-}base}$ may be a closed-loop quantity controlled by Node B 108 with the fixed step size. Further, $P_{e\text{-}base}$ may be defined as the reference desired enhanced physical uplink channel (E-PUCH) RX power, e.g., the required signal power at the reference code rate with an expected block error rate (BLER), such as in dB domain in equation (1).

$$P_{e\text{-}base} = \text{ISCP}_{UL} + \text{SNR}_{des} + \Omega \qquad (1)$$

Where $\Omega$ is a constant factor, $\text{SNR}_{des}$ is a value of a signal to noise ratio (SNR) which may allow Node B 108 to decode a signal from UE 110 with the expected initial transmission BLER, and interference signal code power for the uplink ($\text{ISCP}_{UL}$) is the interference power over the uplink timeslot configured for enhanced dedicated channel (E-DCH) use.

In one aspect, $P_{e\text{-}base}$ may track slowly compared to rapidly changing $\text{ISCP}_{UL}$. In operation, $\text{ISCP}_{UL}$ may experience extensive fluctuations, especially when an entire E-PUCH timeslot is allocated to one UE 110. In such an aspect, the probability of E-PUCH cyclic redundancy check (CRC) error may depend on the UE 110 received signal code power (RSCP) and $ISCP_{UL}$. In order to maintain a desired CRC error probability, it may be desirable to quickly adjust $P_{e\text{-}base}$ with change of $ISCP_{UL}$ to get a reasonable carrier to noise ration (C/I) or SNR. As such, it may be beneficial if $P_{e\text{-}base}$ tracks with changes of $ISCP_{UL}$. In the current standard, $P_{e\text{-}base}$ can only be incremented or decremented by a fixed step size, which makes use of $P_{e\text{-}base}$ to track rapid changes of $ISCP_{UL}$ difficult. Consequently P, as $P_{e\text{-}base}$ may deviate from an intended value, a UE 110 may report an improper UPH and Node B 108 may schedule an improper power grant. UPH may be defined generally according to equation (2).

$$UPH = P_{max} - PL - P_{e\text{-}base} \quad (2)$$

Where $P_{max}$ denotes the maximum allowed transmit power of UE 110, and PL denotes the serving cell path loss. In one aspect, assuming $P_{e\text{-}base}$ is well synchronized between UE 110 and Node B 108, it can be seen, that when $P_{e\text{-}base}$ is higher than it should be, UE 110 may report a lower UPH and Node B 108 may allocate a smaller gain factor, then lower code rate E-PUCH is transmitted at UE, which results in poor power usage and lower traffic throughput. In another, it can be seen, that when $P_{e\text{-}base}$ is lower than it should be, UE may report a higher UPH and Node B may allocate a larger gain factor, then higher code rate E-PUCH is transmitted at UE, which results in high block error of E-PUCH. One cause of such discrepancies may be that Node B 108 may be aware of changes in $ISCP_{UL}$ of which the UE 110 is not aware.

Another aspect, a mismatch in $P_{e\text{-}base}$ may occur between Node B 108 and UE 110. In one aspect, such a mismatch may be a result of transmission failure of E-AGCH or E-HICH, where some transmit power control (TPC) commands generated at Node B would not reach UE. When $P_{e\text{-}base}$ at Node B 108 is higher than that at UE 110, UE may report higher UPH while Node B allocates a smaller power grant in order to avoid inter-cell interference, resulting in poor power usage and lower throughput. When $P_{e\text{-}base}$ at Node B 108 is lower than that at UE 110, UE 110 may report lower UPH and Node B 108 then allocates a smaller power, also resulting in poor power usage and lower throughput.

Additionally, $P_{e\text{-}base}$ may track slowly compared to a rapid fading channel. In such an aspect, assuming that $ISCP_{UL}$ is kept constant, when the uplink transmission experiences a good channel condition, Node B 108 may get high SNR estimate and a 'Down' TPC command follows to decrease $P_{e\text{-}base}$. In another aspect, an 'Up' TPC command may be given to increase $P_{e\text{-}base}$. As such, fast fading of wireless channel may cause fluctuations of $P_{e\text{-}base}$.

In summary, the power control of $P_{e\text{-}base}$ aims to track both channel fading and $ISCP_{UL}$ fluctuation to achieve a proper scheduling decision. Taking into consideration the long period of power control, fixed and small step size, and the variation speed of channel fading and $ISCP_{UL}$ fluctuation, $P_{e\text{-}base}$ may not be an optimal power control mechanism for a TD-HSUPA system.

Therefore, a second UPH definition may be used. UPH may be defined as the maximum allowed transmit power $P_{max}$ relative to the serving cell path loss PL. As such, the UPH may indicate the maximum received power at Node B if the maximum allowed transmit power at UE is employed. As described in equation (3).

$$UPH = P_{max} - PL \quad (3)$$

In one aspect, Node B 108 may maintain a channel fading estimation factor X for each UE. In case of an initial request, X is initialized as described in equation (4).

$$X = RSCP_{E\text{-}RUCCH,Est} - RSCP_{E\text{-}RUCCH,Des} \quad (4)$$

Where $RSCP_{E\text{-}RUCCH,Est}$ denotes the estimated RSCP of E-RUCCH, and $RSCP_{E\text{-}RUCCH,Des}$ denotes the desired E-RUCCH RSCP signaled to UE by the network in the fast physical access channel (FPACH) response to the UE's successful SYNC_UL transmission. The factor X reflects the channel fading change at the time of an enhanced random access uplink control channel (E-RUCCH) transmission compared to the average channel condition. If the instantaneous channel condition is better than the average channel condition at time of E-RUCCH transmission, X is larger than 1; otherwise X is less than 1.

In the case of an established HSUPA session, channel fading estimation factor X may be updated with the most recent one or more E-PUCH transmissions. When only the most recent one E-PUCH transmission is used, X may be updated as described in equation (5).

$$X = RSCP_{E\text{-}PUCH,Est} - RSCP_{E\text{-}PUCH,Exp} \quad (5)$$

Where $RSCP_{E\text{-}PUCH,Est}$ denotes the estimated RSCP of the most recently scheduled E-PUCH regardless of its hybrid automatic repeat request (HARQ) process ID and retransmission sequence number (RSN), and $RSCP_{E\text{-}PUCH,Exp}$ denotes the expected RSCP of the same E-PUCH whose calculation will be clarified later. The factor X, as in the case of E-RUCCH mentioned above, reflects the channel fading change at the time of E-PUCH transmission compared to the average channel condition.

In operation, upon reception of SI via E-RUCCH or E-PUCH, Node B 108 may initialize $RSCP_{E\text{-}PUCCH,Exp}$ (expected RSCP of E-PUCH) with UPH in the uplink request, as described in equation (6).

$$RSCP_{E\text{-}PUCH,Exp} = UPH \quad (6)$$

Further, the Node B may update the value with Serving and Neighbor Cell Path loss (SNPL) to control the inter-cell interference of this intended scheduling on intra-frequency neighbor cells.

Taking into account code resources, channel fading estimation factor X, and $ISCP_{UL}$ of the E=PUCH timeslot, the expected E-PUCH SNR ($SNR_{E\text{-}\_\text{-}PUCH,\,Exp}$) can be described in equation (7).

$$SNR_{E\text{-}PUCH,Exp} = RSCP_{E\text{-}PUCH,Exp} - ISCP_{UL} + X + G_{SF} \quad (7)$$

Additionally, in order to eliminate the SNR estimation error of E-PUCH, a quantity $E_{SNR,Est}$ may be introduced for each subframe with the initial value 0. Its updates in dB domain as described in equation (8).

$$E_{SNR,Est}(n) = \alpha^m E_{SNR,Est}(n-m) + (1-\alpha^m)(SNR_{Est}(n) - RSCP_{E\text{-}PUCH,Est}(n) - ISCP_{UL}(n) + G_{SF}) \quad (8)$$

Where m is the space between the most recent uplink E-PUCH and the current one in subframe, $G_{SF}$ is the processing gain of spreading, and α is a parameter to be specified by signaling. Then a new quantity $SNR_{E\text{-}PUCH,Beta,Exp}$ indicating the SNR headroom is introduced as described in equation (9).

$$SNR_{E\text{-}PUCH,Beta,Exp} = SNR_{E\text{-}PUCH,Exp} + E_{SNR,Est} - SNR_{target} \quad (9)$$

Where $SNR_{target}$ corresponding to reference E-PUCH transmission can be adjusted in an outer-loop manner according to BLER of an initial transmission, residual BLER after multiple retransmissions, etc.

Based on $SNR_{E\text{-}PUCH,Beta,Exp}$, together with code resource information, Node B 108 may calculate intended scheduling information, for example through use of a look up table, such as Table 1. Further, Node B 108 may provide Transmission Format Combination Indicator (TFCI) information including code rate and a format style, and an E-UCCH Number Indicator (ENI) indicating the number of E-UCCHs multiplexing with E-PUCH. In one aspect, a code rate for a first scheduling after initial access, may be more conservative to ensure high detection probability.

TABLE 1

Mapping Table of Coderate and SNR for QPSK and 16QAM

| $SNR_{E-PUCH,Beta}$ | Coderate (QPSK) | $SNR_{E-PUCH,Beta}$ | Coderate (16QAM) |
|---|---|---|---|
| −10 | 0.1 | −5 | — |
| −5 | 0.3 | 0 | 0.1 |
| 0 (reference) | 0.5 (reference) | 5 | 0.2 |
| 3 | 0.7 | 10 | 0.4 |
| 7 | 0.9 | 15 | 0.6 |

In one aspect, if Node B 108 changes the spread factor, subject to the receiver demodulation performance or other reasons, the Node B 108 may update $SNR_{E-PUCCH,Exp}$, E-TFCI, ENI and the corresponding $RSCP_{E-PUCH,Exp}$. Further, $\phi$, defined as the ratio of $RSCP_{E-PUCH,Exp}$ to UPH, may be calculated, where $\phi$ is less than 1 in linear domain and negative in dB domain. In one operational aspect, $\phi$ may be quantized and a lower bound may be employed.

Upon calculation of time resources, code resources, E-TFCI, ENI, $\phi$ and other elements, Node B 108 may communicate this control information to UE 108 via a grant channel, such as an enhanced absolute grant channel (E-AGCH). Thereafter, UE 108 may transmit E-PUCH according to the control information from Node B 108, and the power of E-PUCH may be described in equation (10).

$$P_{E-PUCH} = UPH + \phi + PL \quad (10)$$

In one aspect, to allow the Node B 108 to calculate a precise SNR estimation, zero-padding may be employed for E-PUCH transmissions. Further, as E-TFCI is decided by the Node B 108 scheduler, no E-TFCI may be needed in E-UCCH.

In one aspect, where a retransmission experiences worse channel conditions than an initial transmission, UE 108 may increment the E-PUCH power by a step in case of retransmission upon receiving a NACK from Node B 108. This option can be enabled or disabled by a parameter specified by a higher layer element.

In a configuration operable for non-scheduled E-PUCH, code and timeslot resources may remain unchanged. Further, the same table 1 used for scheduled E-PUCH, describing relationships between $SNR_{E-PUCH,Beta}$ and code rate of intended E-PUCH, may be used.

In one aspect, inner-loop TPC commands in E-HICH can be used. For example, UE 110 may adjust its code rate by a step according to the TPC commands it receives, while keeps UL transmit power unchanged, where the step size is specified by signaling. In another example, UE 110 may adjust its power by a step according to the TPC commands it receives, while keeps code rate unchanged, which may probably cause uncontrollable interference over thermal (IoT), where the step size is specified by signaling. In either exemplary case, the definition of $SNR_{E-PUCH,Beta}$ may be modified as described in equation (11), where a recursive average of SNR estimation error $E_{SNR,Est}$ may be introduced to reduce the measurement error.

$$SNR_{E-PUCH,Beta} = RSCP_{E-PUCH,Est} ISCP_{UL} + G_{SF} + E_{SNR,Est} - SNR_{target} \quad (11)$$

Generally, if $SNR_{E-PUCH,Beta}$ is larger than that of the corresponding code rate in Table 1, a "Down" TPC command may be generated and sent to UE 108 via E-HICH, otherwise a "Up" TPC command may follow. In one aspect, due to possible TCP transmission error, E-TFCI may be transmitted in E-UCCH for each non-scheduled transmission.

Figure 2:
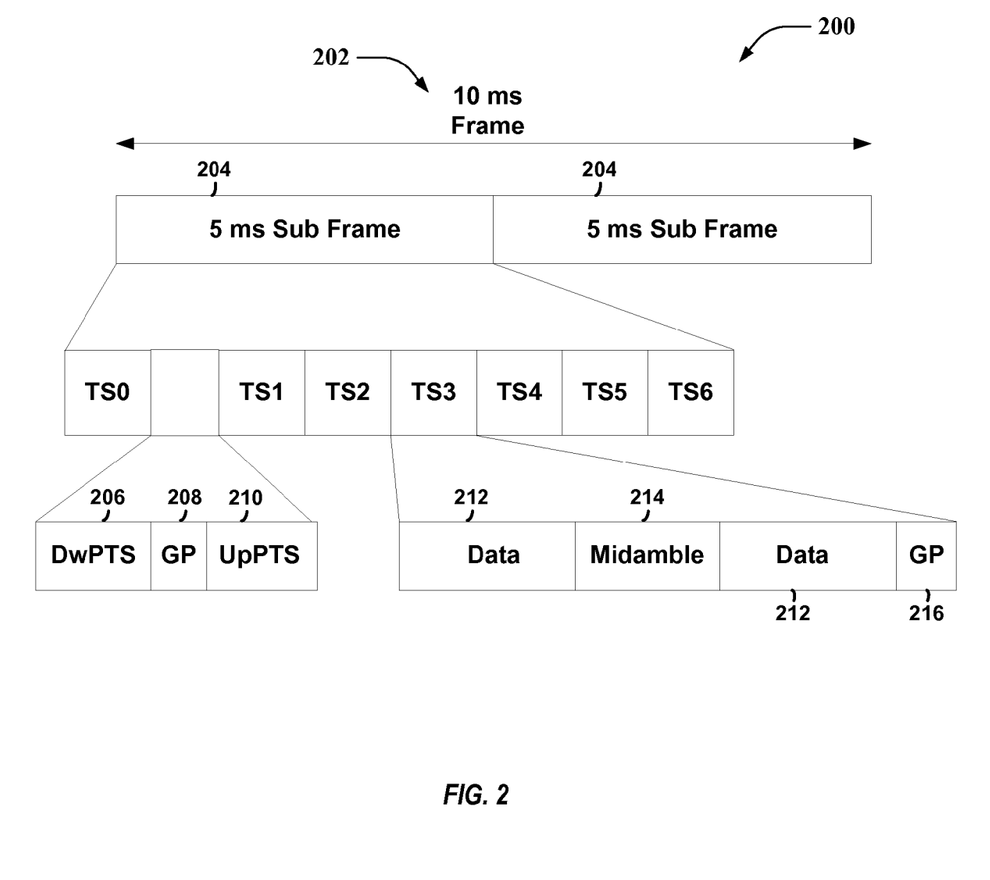
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
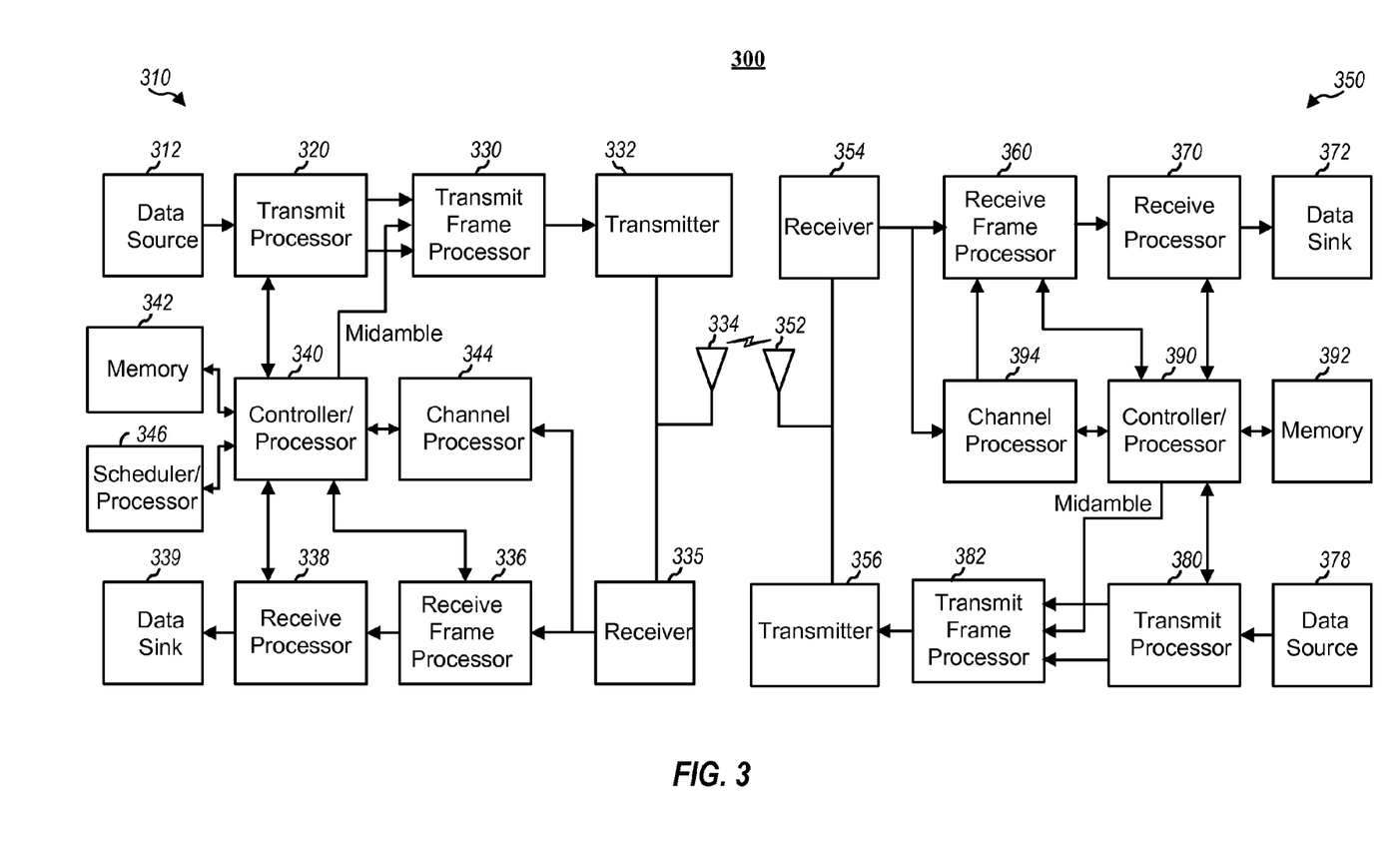
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide CRC codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier.

The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an ACK and/or NACK protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

In one configuration, the apparatus 350 for wireless communication includes means for transmitting, by a UE, a grant request, wherein the grant request includes a UPH value, and mean for receiving, from a Node B, a scheduling grant, wherein the scheduling grant is derived from the transmitted UPH. In one aspect, the means for receiving may include receiver 354. In another aspect, means for incrementing may include controller/processor 390. In still another aspect, the means for transmitting may include transmitter 356. In another configuration, the apparatus 350 includes means for transmitting the grant request using a random access channel. In another configuration, the apparatus 350 includes means for transmitting the grant request using a physical uplink channel. In another configuration, the apparatus 350 includes means for receiving the scheduling grant using an E-AGCH. In another configuration, the apparatus 350 includes means for receiving the scheduling grant using an E-UCCH, where the grant request is a non-scheduled request. In another configuration, the apparatus 350 includes means for incrementing an E-PUCH power up upon receiving a NACK from the Node B. In one aspect, the aforementioned means may be the processor(s) 370, 390 configured to perform the functions recited by the aforementioned means. In another aspect, the aforementioned means may be a module or any apparatus configured to perform the functions recited by the aforementioned means.

Figure 4:
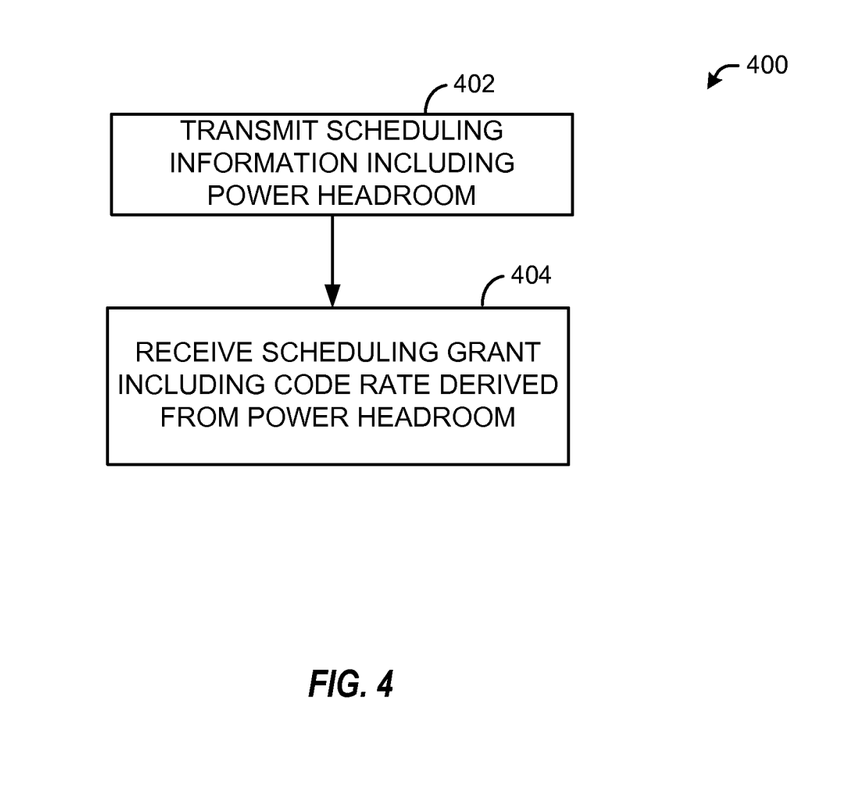
FIG. 4 is a functional block diagram conceptually illustrating example blocks executed to implement the functional characteristics of one aspect of the present disclosure.

FIG. 4 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 is a functional block diagram 400 illustrating example blocks executed in conducting wireless communication according to one aspect of the present disclosure. In block 402, a scheduling request may be transmitted by a UE. In one aspect, the scheduling request may include UPH. In block 404, a scheduling grant may be received, where the granted code rate may be derived from the power headroom. In one aspect, the code rate may be determined using a lookup table, such as table 1. Further, the power headroom may be used to derive a modified SNR value used to determine an appropriate code rate from the look up table. Still further, the modified SNR may include an SNR estimation error value. In another aspect, the SNR estimation error value may include a channel fading change factor, a spreading factor and an expected RSCP value. For further discussion of determining a code rate from UPH refer to equations (3)-(11).

Figure 5:
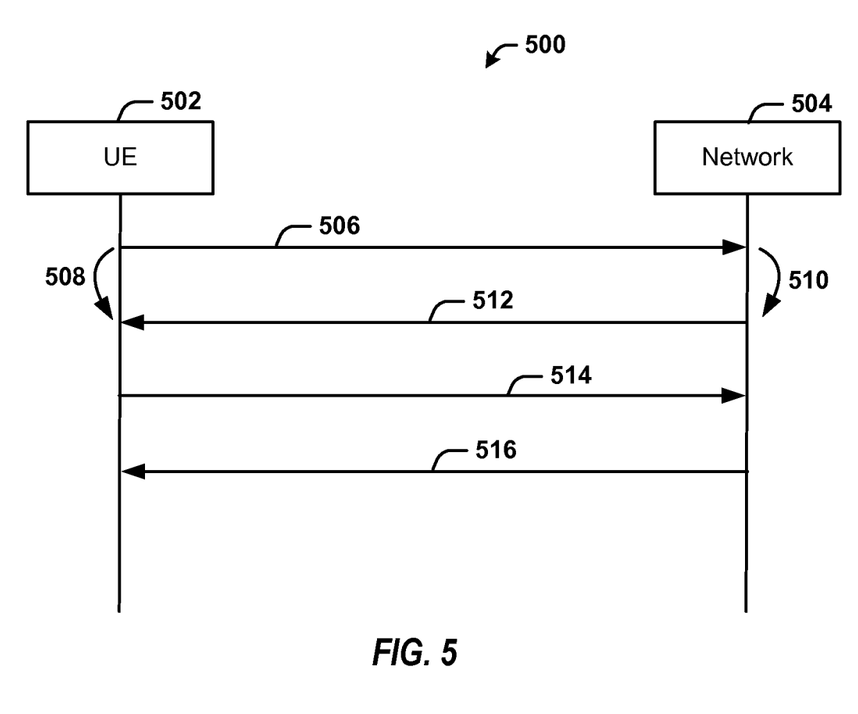
FIG. 5 is an exemplary call-flow diagram of a methodology for facilitating HSUPA in a TD-SCDMA system according to an aspect.

Turning now to FIG. 5, a call flow of an exemplary system 500 for facilitating HSUPA in a TD-SCDMA system is illustrated. Generally, UE 502 and network 504 may communicate. As used herein, network 504 may include one or more Node Bs, one or more RNCs, etc. Further, HSUPA has been introduced into TD-SCDMA specification in 3GPP Rel. 7, and correspondingly in CCSA ver. 3.0. With the high speed uplink capabilities a given UE can transmit at high data rates upon assignment via a scheduling grant from the network.

Returning to FIG. 5, at sequence step 506, UE 502 may communicate a grant request type of scheduling information (SI) to network 504. In one aspect, the SI may include information on the UE 502 power headroom, buffer size, and flow QoS class. In one aspect, the grant request may be made using an enhanced PUCH (E-PUCH) in a MAC-e header, via an enhanced RUCCH (E-RUCCH). At sequence step 508, UE 502 may monitor a channel for a response. In one aspect, the UE 502 may monitor an enhanced AGCH (E-AGCH). At sequence step 510, the network 504 may receive the grant request and may make a resource grant decision. At sequence step 512, network 504 may communicate granted power and resource information to the UE 502. In one aspect, the grant is communicated using the E-AGCH. In another aspect, the grant may include information regarding an E-PUCH (data channel) and E-HICH (downlink ACK for uplink traffic H-ARQ process) channel allocation as well as the maximum payload and modulation format allowed. At sequence step 514, using the received grant information, UE 502 may communicate uplink control information and data on assigned channels according to the individual granted power and resources. At sequence step 516, upon receiving control information associated with enhanced DCH (E-DCH), an appropriate ACK/NACK response is communicated to UE 502. In one aspect, the scheduled UE 502 may then proceed with data transmission upon the grant and proceed with the request/grant process, where the request could be embedded in E-PUCH.

Figure 6:
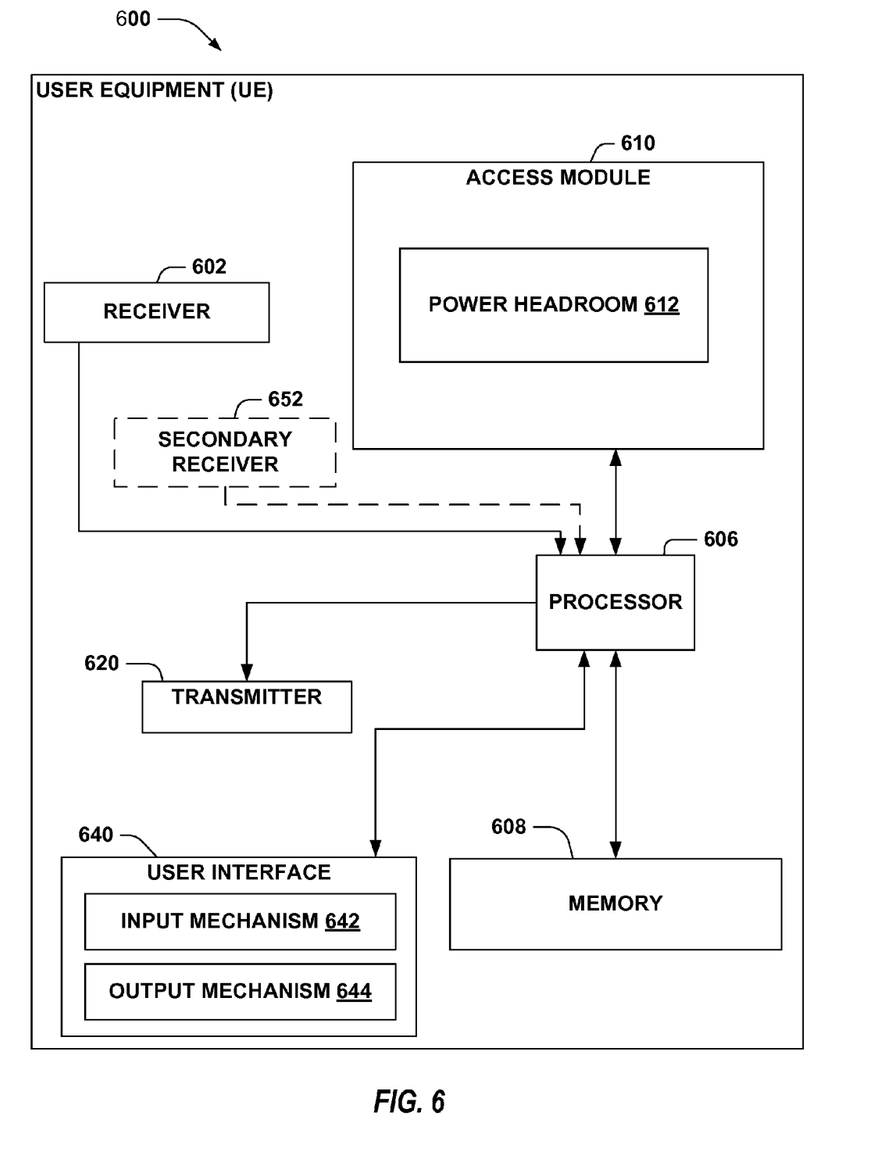
FIG. 6 is a block diagram of an exemplary wireless communications device configured to avoid Physical Random Access Channel collisions according to an aspect.

With reference now to FIG. 6, an illustration of a UE 600 (e.g. a client device, wireless communications device (WCD), etc.) that can avoid random access procedure collisions is presented. UE 600 comprises receiver 602 that receives one or more signal from, for instance, one or more receive antennas (not shown), performs typical actions on (e.g., filters, amplifies, downconverts, etc.) the received signal, and digitizes the conditioned signal to obtain samples. Receiver 602 can further comprise an oscillator that can provide a carrier frequency for demodulation of the received signal and a demodulator that can demodulate received symbols and provide them to processor 606 for channel estimation. In one aspect, UE 600 may further comprise secondary receiver 652 and may receive additional channels of information.

Processor 606 can be a processor dedicated to analyzing information received by receiver 602 and/or generating information for transmission by one or more transmitters 620 (for ease of illustration, only one transmitter is shown), a processor that controls one or more components of UE 600, and/or a processor that both analyzes information received by receiver 602 and/or secondary receiver 652, generates information for transmission by transmitter 620 for transmission on one or more transmitting antennas (not shown), and controls one or more components of UE 600.

UE 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods is intended to comprise, without being limited to, these and any other suitable types of memory.

UE 600 can further comprise access module 610 which may be operable to effectively facilitate grant scheduling for the UE 600. In one aspect, access module 610 may include power headroom module 612 which may be operable to determine the UPH for the UE 600. In another aspect, access module 610 may be operable to process a received scheduling grant from a Node B, such as described with reference to FIG. 4.

Additionally, UE 600 may include user interface 640. User interface 640 may include input mechanism 642 for generating inputs into UE 600, and output mechanism 644 for generating information for consumption by the user of UE 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, output mechanism 644 may include a display operable to present content that is in image or video format or an audio speaker to present content that is in an audio format.

Figure 7:
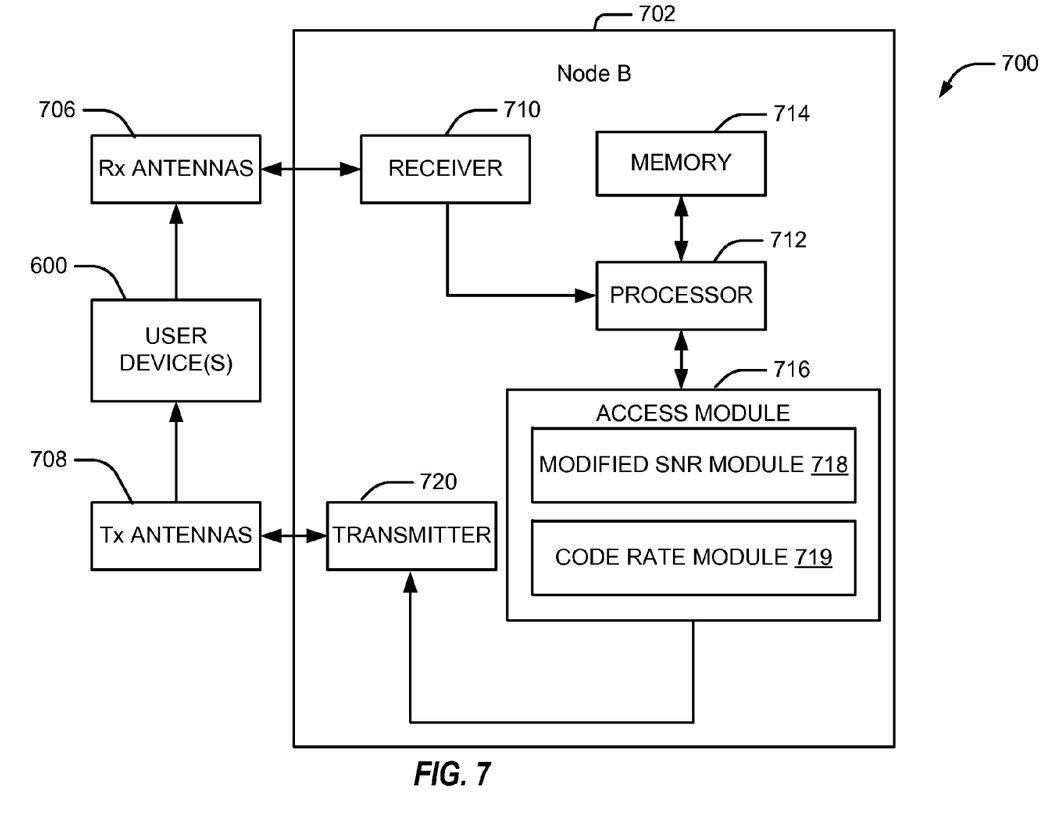
FIG. 7 is a block diagram depicting the architecture of a Node B configured to avoid Physical Random Access Channel collisions according to an aspect.

With reference to FIG. 7, an example system 700 that comprises a Node B 702 with a receiver 710 that receives signal(s) from one or more user devices 600 through a plurality of receive antennas 706, and a transmitter 720 that transmits to the one or more user devices 600 through a plurality of transmit antennas 708. Receiver 710 can receive information from receive antennas 706. Symbols may be analyzed by a processor 712 that is similar to the processor described above, and which is coupled to a memory 714 that stores information related to data processing. Processor 712 is further coupled to access module 716 that facilitates effective grant scheduling for user devices 600.

In one aspect, access module 716 may include modified SNR module 718 and Code Rate module 719. In one aspect, code rate module 719 may include a look up table, such as seen in table 1. In one aspect, modified SNR module 718 is operable to determine $SNR_{E-PUCH,Beta,Exp}$ indicating the SNR headroom, as described above with reference to equations (3)-(11).

Moreover, in one aspect, processor 712 may provide means for generating an SNR headroom value from the UPH, and means for determining a code rate from the SNR headroom value using a look up table. In one aspect, the SNR headroom value may be determined using a first equation for scheduled communications and a second equation for non-scheduled communications.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, HSDPA, HSUPA, High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication in a time division synchronous code division multiple access (TD-SCDMA) system, comprising:
   transmitting, by a user equipment (UE), a grant request, wherein the grant request includes a UE power headroom (UPH) value; and
   receiving, from a Node B, a scheduling grant including a code rate, wherein the scheduling grant is derived from the transmitted UPH.

2. The method of claim 1, wherein the scheduling grant is derived by the Node B from the UPH by generating a signal-to-noise (SNR) headroom value from the UPH, and determining the code rate from the SNR headroom value using a look up table.

3. The method of claim 1, wherein the SNR headroom value is determined using a first equation for scheduled communications, and a second equation for non-scheduled communications.

4. The method of claim 1, wherein the transmitting further comprises transmitting the grant request using a random access channel.

5. The method of claim 1, wherein the transmitting further comprises transmitting the grant request using a physical uplink channel.

6. The method of claim 1, wherein the receiving further comprises receiving the scheduling grant using an enhanced-absolute grant channel (E-AGCH).

7. The method of claim 1, wherein the grant request is a non-scheduled request, and wherein the receiving further comprises receiving the scheduling grant using an enhanced-uplink control channel (E-UCCH).

8. The method of claim 1, further comprising:
incrementing an enhanced physical uplink channel (E-PUCH) power up upon receiving a NACK from the Node B.

9. An apparatus for wireless communication in a TD-SCDMA system, comprising:
means for transmitting, by a UE, a grant request, wherein the grant request includes a UPH value; and
means for receiving, from a Node B, a scheduling grant including a code rate, wherein the scheduling grant is derived from the transmitted UPH.

10. The apparatus of claim 9, wherein the scheduling grant is derived by the Node B from the UPH through means for generating a signal-to-noise (SNR) headroom value from the UPH, and means for determining the code rate from the SNR headroom value from a look up table.

11. The apparatus of claim 9, wherein the SNR headroom value is determined using a first equation for scheduled communications, and a second equation for non-scheduled communications.

12. The apparatus of claim 9, wherein the means for transmitting further comprise means for transmitting the grant request using a random access channel.

13. The apparatus of claim 9, wherein the means for transmitting further comprise means for transmitting the grant request using a physical uplink channel.

14. The apparatus of claim 9, wherein the means for receiving further comprise means for receiving the scheduling grant using an enhanced-absolute grant channel (E-AGCH).

15. The apparatus of claim 9, wherein the grant request is a non-scheduled request, and wherein the means for receiving further comprise means for receiving the scheduling grant using an enhanced-uplink control channel (E-UCCH).

16. The apparatus of claim 9, further comprising:
means for incrementing an enhanced physical uplink channel (E-PUCH) power up upon receiving a NACK from the Node B.

17. A computer program product, comprising:
a non-transitory computer-readable medium comprising code for:
transmitting, by a UE, a grant request, wherein the grant request includes a UPH value; and
receiving, from a Node B, a scheduling grant including a code rate, wherein the scheduling grant is derived from the transmitted UPH.

18. The computer program product of claim 17, wherein the scheduling grant is derived by the Node B from the UPH by generating a signal-to-noise (SNR) headroom value from the UPH, and determining the code rate from the SNR headroom value using a look up table.

19. The computer program product of claim 17, wherein the SNR headroom value is determined using a first equation for scheduled communications, and a second equation for non-scheduled communications.

20. The computer program product of claim 17, wherein the non-transitory computer-readable medium further comprises code for:
transmitting the grant request using a random access channel.

21. The computer program product of claim 17, wherein the non-transitory computer-readable medium further comprises code for:
transmitting the grant request using a physical uplink channel.

22. The computer program product of claim 17, wherein the non-transitory computer-readable medium further comprises code for:
receiving the scheduling grant using an enhanced-absolute grant channel (E-AGCH).

23. The computer program product of claim 17, wherein the grant request is a non-scheduled request, and wherein the non-transitory computer-readable medium further comprises code for:
receiving the scheduling grant using an enhanced-uplink control channel (E-UCCH).

24. The computer program product of claim 17 wherein the non-transitory computer-readable medium further comprises code for:
incrementing an enhanced physical uplink channel (E-PUCH) power up upon receiving a NACK from the Node B.

25. An apparatus for wireless communication in a TD-SCDMA system, comprising:
at least one processor;
a memory coupled to the at least one processor;
a transmitter configured to transmit a grant request, wherein the grant request includes a UPH value; and
a receiver configured to receive, from a Node B, a scheduling grant including a code rate, wherein the scheduling grant is derived from the transmitted UPH.

26. The apparatus of claim 25, wherein the scheduling grant is derived by the Node B from the UPH by generating a signal-to-noise (SNR) headroom value from the UPH, and determining the code rate from the SNR headroom value using a look up table.

27. The apparatus of claim 25, wherein the SNR headroom value is determined using a first equation for scheduled communications, and a second equation for non-scheduled communications.

28. The apparatus of claim 25, wherein the transmitter is further configured to:
transmit the grant request using a random access channel.

29. The apparatus of claim 25, wherein the transmitter is further configured to:
transmit the grant request using a physical uplink channel.

30. The apparatus of claim 25, wherein the receiver is further configured to:
receive the scheduling grant using an enhanced-absolute grant channel (E-AGCH).

31. The apparatus of claim 25, wherein the grant request is a non-scheduled request, wherein the receiver is further configured to:
receive the scheduling grant using an enhanced-uplink control channel (E-UCCH).

32. The apparatus of claim 25, wherein the at least one processor is configured to:
increment an enhanced physical uplink channel (E-PUCH) power up upon receiving a NACK from the Node B.

* * * * *